United States Patent
Leask et al.

(10) Patent No.: US 12,537,735 B2
(45) Date of Patent: Jan. 27, 2026

(54) MOBILE NETWORK SYNCHRONIZATION DOMAIN ANOMALY IDENTIFICATION AND CORRELATION

(71) Applicant: EXFO Solutions SAS, Saint-Jacques-de-la-Lande (FR)

(72) Inventors: Patrick Leask, Dalgety Bay (GB); Sebastien Prieur, Montreal (CA)

(73) Assignee: TC France S.A.S., Saint-Jacques-de-la-Lande (FR)

( * ) Notice: Subject to any disclaimer, the term of this patent is extended or adjusted under 35 U.S.C. 154(b) by 0 days.

(21) Appl. No.: 18/353,227

(22) Filed: Jul. 17, 2023

(65) Prior Publication Data

US 2024/0056346 A1   Feb. 15, 2024

Related U.S. Application Data (60) Provisional application No. 63/389,978, filed on Jul. 18, 2022.

(51) Int. Cl.
*H04L 41/0631* (2022.01)
*H04L 51/23* (2022.01)

(52) U.S. Cl.
CPC ............ *H04L 41/065* (2013.01); *H04L 51/23* (2022.05)

(58) Field of Classification Search
CPC ... H04L 43/08; H04L 41/0631; H04L 41/065; H04L 51/23; H04W 56/00; H04W 56/002; H04W 24/08
See application file for complete search history.

(56) References Cited

U.S. PATENT DOCUMENTS 7,372,875 B2 * 5/2008 Hadzic .................... H03L 7/148
375/373
9,788,291 B1 * 10/2017 Tracy .................... H04W 24/08
(Continued)

FOREIGN PATENT DOCUMENTS

WO   2021258110 A1   12/2021

OTHER PUBLICATIONS

Exfo: "Nova SensAI—Reveal the invisible", Jan. 22, 2021 (Jan. 22, 2021), pp. 1-23, Retrieved from the Internet: URL:https://www.exfo.com/contentassets/ baf1 c3e61 edf4a0a91 bc282cf825baf8/ exfo-nova-sensai-solutio**infobrief-2021-01_v2.pdf [retrieved on Nov. 16, 2023].

(Continued)

*Primary Examiner* — Madhu Woolcock
(74) *Attorney, Agent, or Firm* — Baratta Law PLLC; Lawrence A. Baratta, Jr.; Ryan Odessa (57) ABSTRACT

Systems and methods of mobile network synchronization domain anomaly identification and correlation include receiving measurements from a synchronization domain reflecting the performance of synchronization across a mobile network; identifying synchronization domain anomalies in the measurements from the synchronization domain; correlating of the synchronization domain anomalies against anomalies from other domains of the mobile network; and one or more of (1) identifying root causes of the synchronization domain anomalies and the anomalies from other domains, (2) identifying associated impact on services and/or subscribers of the synchronization domain anomalies and the anomalies from other domains, and (3) identifying remedial actions for the synchronization domain anomalies and the anomalies from other domains.

19 Claims, 5 Drawing Sheets

(56) References Cited

U.S. PATENT DOCUMENTS

| | | | |
|---|---|---|---|
| 10,594,542 B2 | 3/2020 | Jeyakumar et al. | |
| 11,005,585 B1* | 5/2021 | Gopalakrishnan | H04J 3/0667 |
| 11,115,142 B1* | 9/2021 | Ozarkar | H04L 43/106 |
| 11,522,766 B2 | 12/2022 | Boussac et al. | |
| 2004/0027277 A1* | 2/2004 | Diggelen | G01S 19/01 |
| | | | 342/357.62 |
| 2007/0067264 A1* | 3/2007 | Froehlich | H04L 67/04 |
| 2009/0183030 A1* | 7/2009 | Bethke | G06F 11/079 |
| | | | 714/37 |
| 2010/0268797 A1* | 10/2010 | Pyrik | H04L 43/00 |
| | | | 709/224 |
| 2011/0158114 A1* | 6/2011 | Novak | H04J 3/0644 |
| | | | 370/252 |
| 2012/0275377 A1* | 11/2012 | Lehane | H04L 41/0816 |
| | | | 370/328 |
| 2013/0235888 A1* | 9/2013 | Bui | H04J 3/0641 |
| | | | 370/503 |
| 2014/0192826 A1* | 7/2014 | Zampetti | H04J 3/0658 |
| | | | 370/503 |
| 2015/0071308 A1 | 3/2015 | Webb, III et al. | |
| 2015/0333998 A1* | 11/2015 | Gopalakrishnan | |
| | | | H04L 41/0636 |
| | | | 370/244 |
| 2016/0006526 A1* | 1/2016 | Cho | H04J 3/0667 |
| | | | 370/503 |
| 2017/0094537 A1* | 3/2017 | Yang | H04L 41/0631 |
| 2017/0373950 A1 | 12/2017 | Szilagyi et al. | |
| 2018/0069684 A1* | 3/2018 | Ziren | H04L 5/14 |
| 2018/0199219 A1* | 7/2018 | Kim | H04W 24/08 |
| 2019/0110207 A1* | 4/2019 | Makhijani | H04W 28/16 |
| 2019/0281077 A1* | 9/2019 | Deb | G06F 9/45558 |
| 2020/0259896 A1* | 8/2020 | Sachs | H04L 67/12 |
| 2020/0267057 A1 | 8/2020 | Garvey et al. | |
| 2020/0322367 A1* | 10/2020 | Salvat Lozano | H04L 41/5009 |
| 2021/0344582 A1* | 11/2021 | Samadi | H04L 43/0852 |
| 2021/0359778 A1* | 11/2021 | Wang | H04L 69/28 |
| 2022/0095261 A1* | 3/2022 | Smith | H04B 7/024 |
| 2022/0121556 A1 | 4/2022 | Guim Bernat et al. | |
| 2022/0123849 A1* | 4/2022 | McCall | H04J 3/0658 |
| 2022/0159595 A1* | 5/2022 | Lee | G01S 19/256 |
| 2022/0225101 A1* | 7/2022 | Fellows | H04L 41/22 |
| 2022/0342988 A1* | 10/2022 | Brunza | H04L 63/1408 |
| 2022/0400394 A1* | 12/2022 | Eleftheriadis | H04W 24/04 |
| 2023/0128202 A1* | 4/2023 | Minda | G06F 11/302 |
| | | | 709/217 |
| 2023/0152471 A1* | 5/2023 | Nekoui | G01S 19/396 |
| | | | 342/357.64 |
| 2023/0171569 A1* | 6/2023 | Muralimanohar | H04M 15/66 |
| | | | 455/406 |
| 2023/0362807 A1* | 11/2023 | Kodaypak | H04W 52/0203 |
| 2024/0121735 A1* | 4/2024 | Li | H04W 56/002 |
| 2024/0298281 A1* | 9/2024 | Kovács | H04J 3/0667 |

OTHER PUBLICATIONS

Debicki Patryk M. et al.: "Application of AI/ML Technology to Address Congestion, Quality, and Security of Private Military Network Deployments", IST-190 Research Symposium -AI, ML and BO for Hybrid Military Operations (AI4HMO), Oct. 6, 2021 (Oct. 6, 2021), Retrieved from the Internet: URL:https://www.sto.nato.int/publications/ ST0%20Meeting%20Proceedings/STO-MP-IST-190/M P-IST-190-32.pdf [retrieved on Nov. 16, 2023].

Baltayan Astra: "Timing and synchronization: why it's critical for 5G networks", Sep. 23, 2021 (Sep. 23, 2021), Retrieved from the Internet: URL:https://www.exfo.com/en/resources/blog/timing-synchronization-5g.networks/ [retrieved on Nov. 16, 2023].

Qing et al., Research on 5G High Precision Time Synchronous Networking Scheme [online]. 2021 IEEE 3rd International Conference on Civil Aviation Safety and Information Technology (ICCASIT) [retrieved on May 5, 2022]. Retrieved from the Internet: <URL: https://ieeexplore.ieee.org/document/9633688> <DOI: 10.1109/ICCASIT53235.2021.9633688>.

Godor et al., A Look Inside 5G Standards to Support Time Synchronization for Smart Manufacturing, Dec. 31, 2020 [online]. IEEE Communications Standards Magazine . Sep. 2020 [retrieved on May 6, 2022]. Retrieved from the Internet: <URL: https://ieeexplore.ieee.org/stamp/stamp.jsp?tp=&arnumber=9204594> <DOI: 10.1109/MCOMSTD.001.2000010>.

Li, Research into the Deployment and Application of Intelligent Time Network, Apr. 30, 2021 [online]. ZTE Technologies Apr. 2021, vol. 23 No. 2 Issue 193 [retrieved on May 6, 2022]. Retrieved from the Internet: <URL: https://res-www.zte.com.cn/mediares/magazine/publication/tech_en/pdf/202102.pdf>.

Cansastro et al., Root Cause Analysis in 5G/6G Networks, Dec. 31, 2021[online]. 2021 8th International Conference on Future Internet of Things and Cloud (FiCloud) [retrieved on May 5, 2022]. Retrieved from the Internet: <URL: https://ieeexplore.ieee.org/document/9590411> <DOI: 10.1109/FICLOUD49777.2021.00039>.

Bhalgat, Deploying Time-Sensitive 5G Networks at the Dawn of AI for Telcos, Mar. 8, 2021 [online]. NVIDIA Technical Blog [retrieved on May 5, 2022]. Retrieved from the Internet: <URL: https://developer.nvidia.com/blog/deploying-time-sensitive-5g-networks-at-the-dawn-of-ai-for-telcos/>.

* cited by examiner

MOBILE NETWORK SYNCHRONIZATION DOMAIN ANOMALY IDENTIFICATION AND CORRELATION

CROSS-REFERENCE TO RELATED APPLICATION(S)

The present disclosure claims priority to U.S. Provisional Patent Application No. 63/389,978, filed Jul. 18, 2022, the contents of which are incorporated by reference in their entirety.

FIELD OF THE DISCLOSURE

The present disclosure relates generally to wireless networking. More particularly, the present disclosure relates to systems and methods for mobile network synchronization domain anomaly identification and correlation.

BACKGROUND OF THE DISCLOSURE

It is critical to monitor communication networks, specifically mobile networks, to detect any anomalies for applying correction actions based thereon. An anomaly can be anything in the mobile network causing network outages, disruptions, poor quality, and the like. Various management and monitoring systems produce a large amount of real-time data, which cannot be comprehended and efficiently processed by the users (e.g., operators, technicians). In particular, the monitoring systems gather real-time data, which may include telemetry data, alarms, warnings, performance monitoring, data from passive or active probes etc., and it is possible to detect transient or persistent events, such as anomalies in the operation of the communication network. An important challenge is to simplify the investigation, prioritize the events and utilize the resources effectively. When receiving large amounts of information, such a challenge is difficult to achieve even for very skilled operators, and it is desirable to provide automated tools to help the operators.

In particular, it is desirable to determine automatically the root-cause of observed events, such as alarms and anomalies. Some events can be the cause of others, creating complex hierarchy links between events, and it is desirable to show those correlations and to determine automatically which one is the root cause. For example, such an approach is described in commonly-assigned U.S. Pat. No. 11,522,766, issued Dec. 6, 2022, and entitled "Method and system for determining root-cause diagnosis of events occurring during the operation of a communication network," the contents of which are incorporated by reference in their entirety.

In prior art systems which take data sources from multiple domains within a mobile network, identify anomalies within each domain, and then correlate the anomalies across the domains to identify root cause(s) for service-affecting or customer-impacting issues, there remains a need to consider synchronization domain issues.

BRIEF SUMMARY OF THE DISCLOSURE

The present disclosure relates to systems and methods for mobile network synchronization domain anomaly identification and correlation. Specifically, the present disclosure address challenges related to synchronization in a 5G mobile network. The present disclosure combines various existing testing and service assurance solutions, including multiprotocol testing devices, active test probes, machine learning (ML)-based anomaly detection and correlation systems, and the like. Specifically, an anomaly detection and correlation system can digest various network performance measurements and correlate synchronization performance data with other network performance data, to offer a cross-domain anomaly detection and correlation approach. Conventional approaches for synchronization monitoring focus on systems that solely monitor individual clock performance, lacking any insight or combination with data from other domains (e.g., transport network, core network, radio access network (RAN), and the like). This results in a lack of understanding of the impact of synchronization problems on network services as well as an inability to understand the root causes of any synchronization problems.

In various embodiments, the present disclosure includes a method having steps, a processing device or cloud service configured to implement the steps, and a non-transitory computer-readable medium including instructions that, when executed, cause one or more processors to implement the steps. The steps include receiving measurements from a synchronization domain reflecting the performance of synchronization across a mobile network; identifying synchronization domain anomalies in the measurements from the synchronization domain; correlating the of synchronization domain anomalies against anomalies from other domains of the mobile network; and one or more of (1) identifying root causes of the synchronization domain anomalies and the anomalies from other domains, (2) identifying associated impact on services and/or subscribers of the synchronization domain anomalies and the anomalies from other domains, and (3) identifying remedial actions for the synchronization domain anomalies and the anomalies from other domains.

The other domains can include one or more of a radio access network (RAN) domain, a transport domain, and a mobile core domain. The synchronization domain can include receivers in the mobile network configured to calculate a reference time from a Global Navigation Satellite System (GNSS); and a plurality of clocks configured to measure transmission delays, calculate the reference time, and communicate to one another via precision time protocol (PTP) messages. The measurements from the synchronization can include any of a maximum time error (TE), a constant time error (cTE), and a dynamic time error (dTE), each being determined at a point in the mobile network.

The correlating of the synchronization domain anomalies against anomalies from other domains can include a transport network domain where the anomalies therein are determined based on any of resource exhaustion, port utilization, dropped packets, packet loss, latency, and jitter. The synchronization domain anomalies can include a determination of accuracy of a received GNSS time reference based on any of average signal strengths of all satellites in use, Time Dilution of Precision (TDOP), Geometric Dilution of Precision (GDOP) and mean accuracy. The correlating of the synchronization domain anomalies against anomalies from other domains can include a radio access network (RAN) domain and a mobile core domain, and wherein the anomalies from the other domains are based on any of failures, Data radio bearer (DRB) Accessibility, Quality of service (QoS) Flow Retainability, DRB Retainability, and Handover Success Rate.

Each of the synchronization domain anomalies and the anomalies from the other domains can be defined by time values, severity, impact, and a dimensional signature. The correlating of the synchronization domain anomalies against anomalies from the other domains of the mobile network can include analyzing measurements from the synchronization domain and measurements from the other domains, collectively forming measurements data on several dimensions associated with an event. The analyzing on the several dimensions can include determining precision time protocol (PTP) messages are being dropped or delayed, determining a root cause of the synchronization domain anomalies is a transport domain issue. The analyzing on the several dimensions can include determining a correlation between the synchronization domain anomalies and a mobile core anomaly, determining a root cause of the mobile core anomaly is a synchronization domain issue. The analyzing on the several dimensions can include determining a correlation between the synchronization domain anomalies and a radio access network (RAN) anomaly, determining a root cause of the RAN anomaly is a synchronization domain issue.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
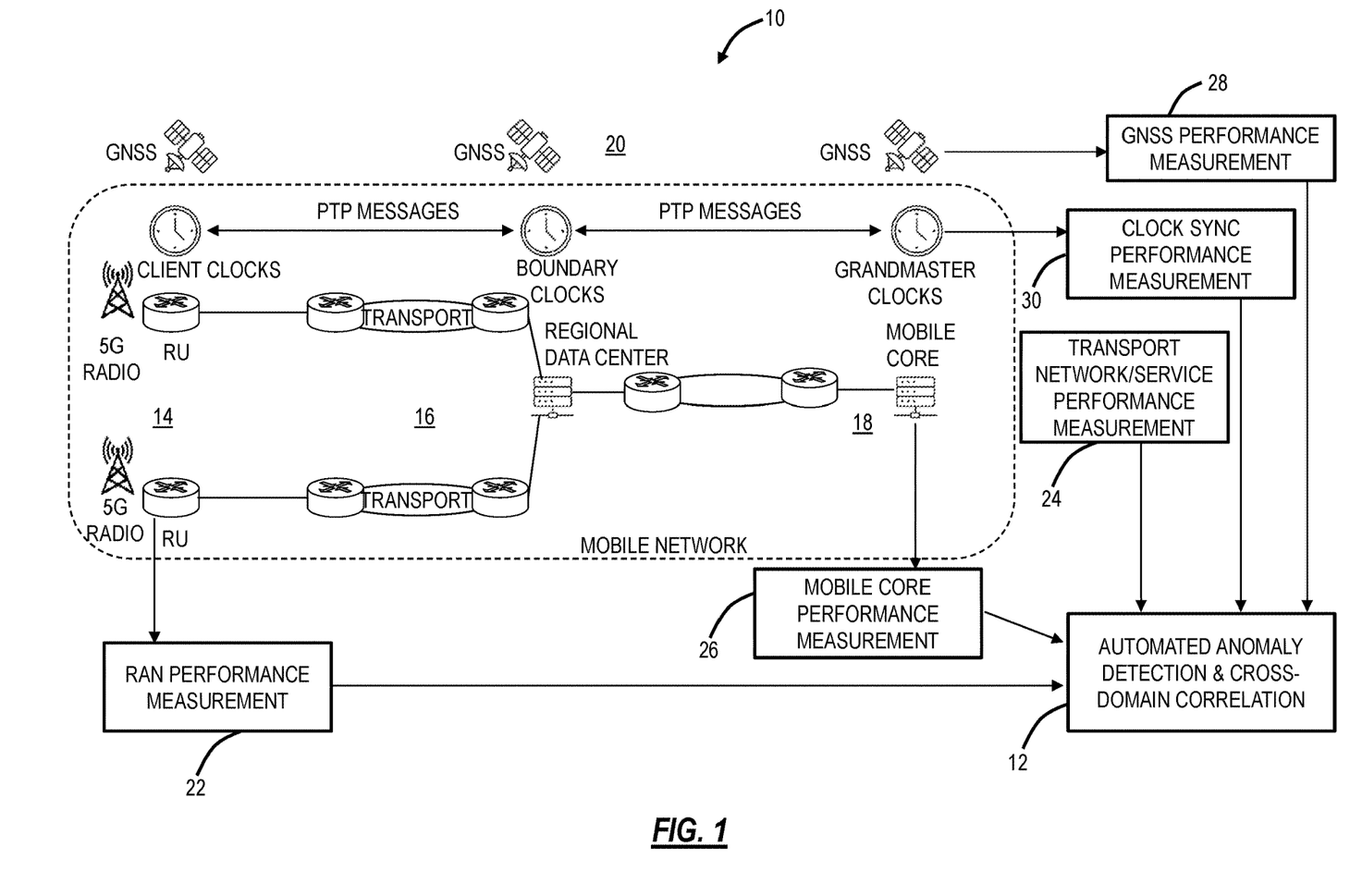
FIG. 1 is a network diagram of a mobile network with an automated anomaly detection and cross domain correlation system for monitoring thereof.

Again, the present disclosure relates to systems and methods for mobile network synchronization domain anomaly identification and correlation.
5G Mobile Network FIG. 1 is a network diagram of a mobile network 10 with an automated anomaly detection and cross domain correlation system 12 for monitoring thereof. FIG. 1 is a simplified view of a 5G mobile network 10 for illustrating testing and service assurance elements. Those skilled in the art will recognize a practical embodiment can include other elements, etc. The mobile network 10 includes various domains, including a RAN domain 14 which can include 5G radios, radio units (RUs), next generation node B (gNodeB, gNB), and the like. Another domain includes a transport domain 16 which interconnects the RAN domain 14 to a mobile core domain 18, which can include various functions in data centers. The mobile network 10 includes a synchronization domain 20 which provides synchronization across the other domains 14, 16, 18. The synchronization domain 20 includes various clocks, i.e., client clocks, boundary clocks, grandmaster clocks, etc. which communicate to one another via precision time protocol (PTP) messages. The synchronization domain 20 can also include a global navigation satellite system (GNSS). The GNSS is a general term describing any satellite constellation that provides positioning, navigation, and timing services, e.g., global positioning satellite (GPS) is an example of a GNSS.

The automated anomaly detection and cross domain correlation system 12 is configured to receive data from various modules 22, 24, 26, 28, 30 involved in monitoring the network 10. The modules 22, 24, 26, 28, 30 can be software such as services executed on hardware devices, in a cloud environment, or the like, with the software configured to perform functionality involved in collecting performance measurement data from the domains 14, 16, 18, 20 and providing the collected performance measurement data to the system 12. As is known in the art, the performance measurement data can be anything describing operations, including performance monitoring (PM) data, key performance indicators (KPIs), alarms, and the like.

A RAN performance measurement module 22 is configured to monitor and generate performance measurement data from the RAN domain 14. A transport domain performance measurement module 24 is configured to monitor and generate performance measurement data from the transport domain 16, i.e., metro, transport network, service performance data. A mobile core domain performance measurement module 26 is configured to monitor and generate performance measurement data from the mobile core domain 18.

The present disclosure further includes two modules 28, 30 for monitoring the synchronization domain 20. Specifically, a GNSS performance measurement module 28 is configured to collect information from the clocks to measure GNSS performance data, and a clock sync performance measurement module 30 is configured to collect information from the clocks to measure sync performance.

The automated anomaly detection and correlation system 12 takes the multiple sets of performance measurement data, identifies anomalies within each data set, and then correlates multiple anomalies together into anomaly case groups that can span multiple domains, along with service/customer impact, diagnostic and root cause information.

The system 12 is configured to provide service assurance which enables visibility and diagnostics for complex transport networks, extensive RAN footprints, and the services, devices and user experiences they support.
5G Network Synchronization 5G is greatly increasing the demands of time and phase synchronization within mobile networks, due to the much tighter synchronization required between RAN nodes. Sync network performance is critical for 5G services, especially those requiring phase synchronization across multiple locations (e.g., coordinated multipoint, carrier aggregation, evolved Multimedia Broadcast Multicast Service (eM-BMS)). The present disclosure considers synchronization domain issues, among other domain issues in the system 12. This is especially relevant within the context of NR (5G New Radio) or LTE-A Pro (LTE-Advanced Pro) based networks, where specific applications (e.g. Carrier Aggregation, MIMO) require much tighter time and phase synchronization, and therefore where the correct operation of the Sync domain is now more important than ever.

Within the mobile network 10, the synchronization domain 20 (the network of equipment and connectivity that delivers synchronization across the mobile network) is typically implemented using one of the recommended architectures defined in Architecture and requirements for packet-based time and phase distribution, ITU-T Recommendation G.8275/Y.1369 (10/2020).

ITU-T Recommendation G.8271/Y.1366 (03/2020) defines the time and phase synchronizations required into specific accuracy classes, e.g., Class 4 accuracy is defined as a maximum time error of 1.5 μs between base stations and a common reference point, and this accuracy class is required to support UTRA-TDD, LTE-TDD (small cell), NR TDD, WiMAX-TDD, Synchronous Dual Connectivity and NR carrier aggregation.

GNSS-based synchronization alone is insufficient, due to signal availability, interference or jamming. Transport networks must also deliver synchronization across 5G networks using IEEE 1588 PTP. Telecom regulators in many countries have mandated backup synchronization solutions for their networks in order to mitigate against GPS interference or jamming. ITU-T Recommendation G.8275/Y.1369 (10/2020) defines standard architectures for this packet-based timing approach.

Synchronization networks that inter-connect the clocks are implemented using an overlay on the transport network, e.g., a Layer 2 virtual private network (VPN), therefore the transport network performance is critical to the successful operation of the synchronization domain 20. Until now, communication service providers (CSPs) have not considered the synchronization domain 20 as requiring service assurance, as historically (e.g., for LTE) the synchronization networks have been relatively static once built, and previous time and phase synchronization requirements have not been as demanding. The performance of the transport network is now much more critical to the successful delivery of 5G services.

Traditionally, the synchronization domain 20 has not been included within the scope of service assurance solutions, i.e., the system 12, as with previous generations of mobile networks, the synchronization requirements were relatively simpler and the synchronization domain 20 itself did not change or evolve significantly during the lifetime of the network 10.

In NR networks, the complexity of the synchronization domain 20 increases substantially due to several factors, such as RAN disaggregation, RAN cloudification (i.e., the deployment of RAN resources in the cloud), and cell site densification. This complexity is compounded by NR's more precise time and phase synchronization requirements. In NR networks the correct and accurate operation of the synchronization domain 20 is now much more significant for successful operation of the network 10 and for the delivery of services to subscribers and devices, and therefore this domain 20 now needs to be considered within the scope of multi-domain service assurance solutions, i.e., the system 12, where problems from multiple different domains are analyzed together to understand root cause and impact.

To that end, the present disclosure includes understanding:

(1) when and where synchronization problems are occurring,
(2) what the impact is on services/customers, and
(3) what the root cause might be.

Synchronization Domain

The synchronization domain 20 uses two principal techniques to deliver time and phase synchronization to the RAN nodes where this is required:

(1) GNSS where receivers analyze time signals broadcast from multiple global navigation satellites to calculate the reference time, and
(2) PTP where packets are exchanged between master clocks and client clocks to measure transmission delays and calculate a reference time.

A typical synchronization domain 20 implementation uses a combination of these two techniques. For example, RAN nodes will often have an embedded GNSS receiver to provide time and phase reference, with a backup PTP connection to a Telecom Grand Master (T-GM) clock for use whenever GNSS signals are unavailable or inadequate.

The performance of the synchronization domain 20 is typically measured at each individual end point where synchronization is delivered. This can be at the end points where time and phase synchronization is required (e.g., the RAN nodes) or at various intermediate points in the synchronization domain 20 delivery chain (e.g., at PTP Boundary Clocks or Transparent Clocks). Synchronization performance is typically reported as a Time Error (TE), with measurement standards defined for:

Max |TE|
Constant Time Error (cTE)
Dynamic Time Error (dTE)

Synchronization performance measurements can be obtained from each individual point where synchronization is delivered, typically this is done remotely via standard data collection mechanisms such as simple network management protocol (SNMP) or using proprietary Application Programming Interfaces (APIs). Some synchronization domain 20 equipment vendors also support a centralized collection of synchronization performance measurements, but this centralization is usually restricted to only those synchronization domain elements from that specific vendor.

Currently, the synchronization domain 20 performance is typically analyzed retroactively and manually when troubleshooting known and specific problems. There are no known examples of service assurance solutions where the synchronization domain 20 performance measurements are analyzed automatically together proactively alongside performance measurements from other domains.

Synchronization Domain Service Assurance

Figure 2:
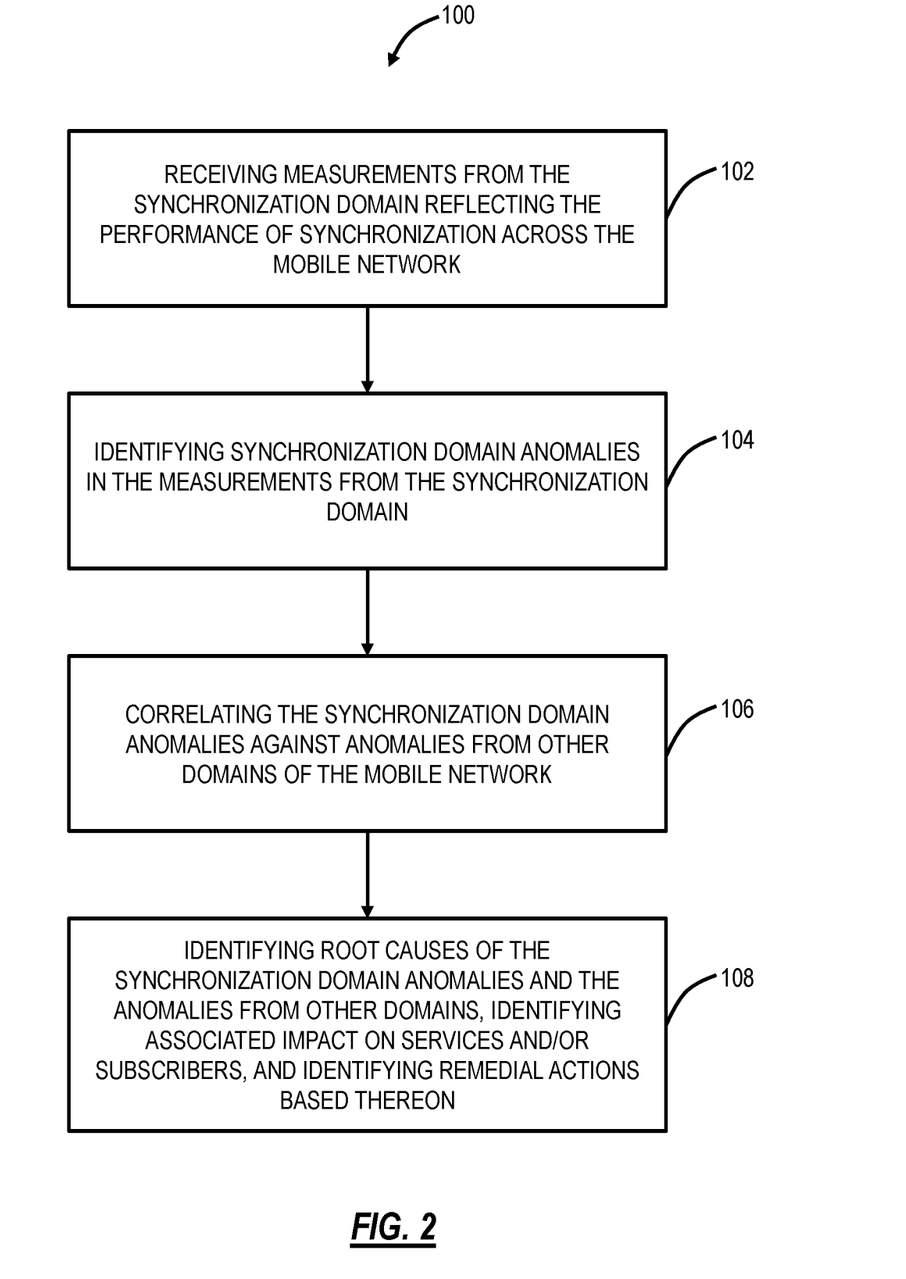
FIG. 2 is a flowchart of a synchronization domain service assurance process.

FIG. 2 is a flowchart of a synchronization domain service assurance process 100. The process 100 contemplates implementation as a method having steps, via a processing device or cloud service configured to implement the steps, and as a non-transitory computer-readable medium including instructions that, when executed, cause one or more processors to implement the steps. The process 100 is described with reference to the automated anomaly detection and cross domain correlation system 12.

The process 100 includes receiving measurements from the synchronization domain reflecting the performance of synchronization across the mobile network (step 102); identifying synchronization domain anomalies in the measurements from the synchronization domain (step 104); correlating of the synchronization domain anomalies against anomalies from other domains of the mobile network (step 106); and identifying root causes of the synchronization domain anomalies and the anomalies from other domains, identifying associated impact on services and/or subscribers, and identifying remedial actions based thereon (step 108).

The correlating step 106 includes correlation of the synchronization domain 20 anomalies against anomalies from other domains, where the other anomalies have been similarly detected from performance data collected from each respective domain. The process 12 can include analysis of correlated anomaly groups to identify the root cause anomaly (or anomalies) within each group and also identify the impact on services or subscribers, i.e., "cause" and "effect."

Correlation Examples

Some examples of other domains relevant for automated analysis alongside the synchronization domain 20 performance measurements are:

(1) Transport Network performance, where the performance of individual elements (e.g., routers, switches, ports, interfaces) in the transport network where the synchronization domain 20 is implemented (synchronization domains are typically implemented as overlays over a transport network). Relevant metrics for analysis with the sync domain will include those measurements that might indicate Latency problems or Dropped Packets, e.g.:

% Resource utilization
% Port Utilization
% Dropped Packets (2) Transport Service performance, where the performance of the end-to-end (E2E) synchronization domain services overlayed on the transport network (e.g., Multiprotocol label switching (MPLS), L2VPN, differentiated services code point (DSCP)) is measured. This can be done passively (reading service performance metrics from the network elements) or actively (injecting test traffic into the endpoints and analyzing the results to measure E2E performance)

Figure 3:
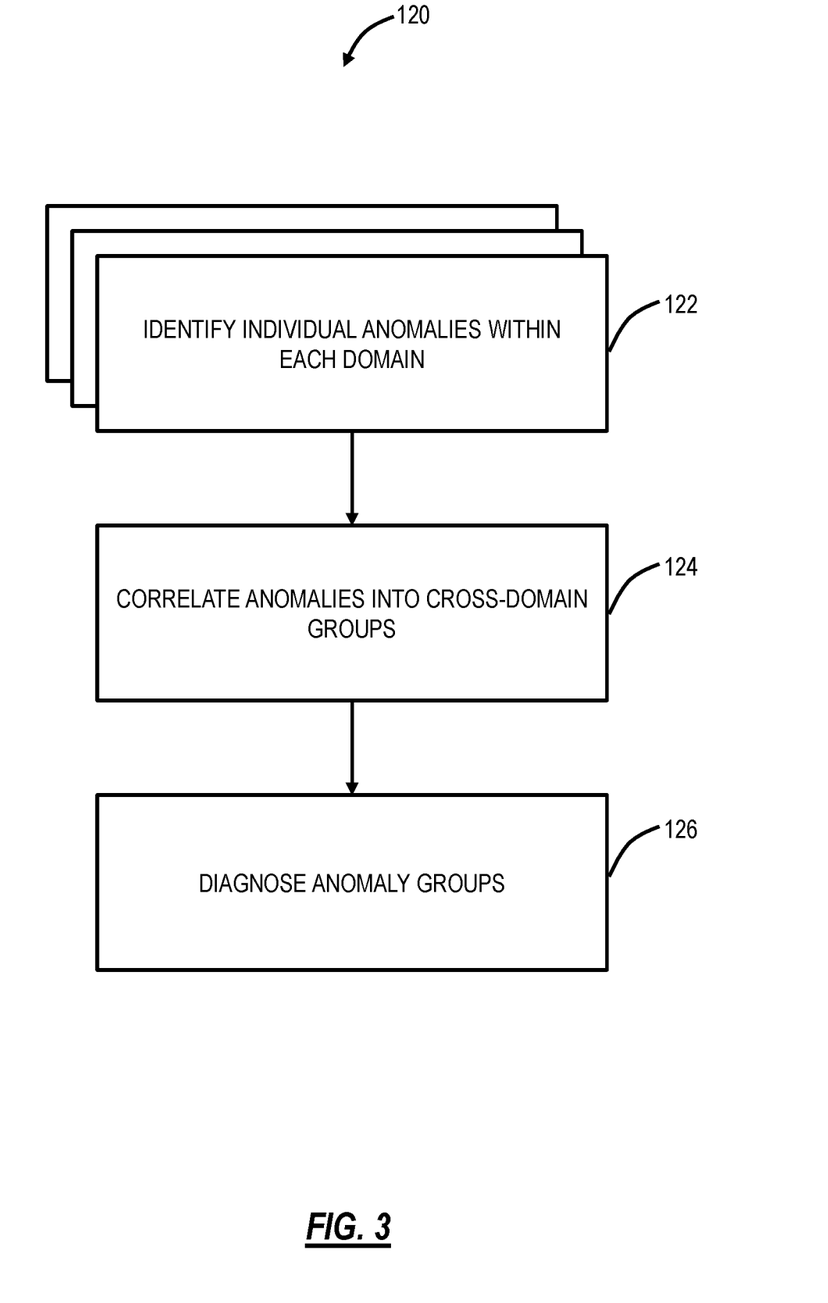
FIG. 3 is a flowchart of an anomaly Identification, grouping, and diagnostic process.

% Packet Loss
Latency
Jitter (3) GNSS, where the performance of the GNSS receivers is measured. Relevant metrics for analysis with the synchronization domain 20 will include those measurements that might indicate the degree of accuracy of the received time reference, e.g.:

Mean C/No (average of the signal strengths of all the satellites "in use")
Time Dilution of Precision (TDOP)
Position of Dilution of Precision (PDOP)
3D Mean Accuracy (4) NR RAN, where the performance of each individual RAN node is measured. Relevant metrics for analysis with the synchronization domain 20 will include those measurements related to interference, or to failures of services requiring RAN nodes to maintain tight time and phase synchronization with neighboring RAN nodes, e.g., CA, coordinated multipoint (CoMP), MIMO Radio Link Failures
Secondary Cell Group (SCG) failures
Handover failures (5) 5G Mobile Core, where the performance of the services provided to end devices by the mobile core network elements is measured. Relevant metrics for analysis with the synchronization domain 20 will include those per-cell measurements related to failures with connections, calls and handovers. Examples of this type of measurement can be found in ETSI 3GPP TS 28.554 version 16.7.0 Release 16, "5G; Management and orchestration; 5G end to end Key Performance Indicators (KPI)", e.g.:

Data radio bearer (DRB) Accessibility
Quality of service (QoS) Flow Retainability
DRB Retainability
NG-RAN Handover Success Rate Anomaly Identification, Grouping, and Diagnosis FIG. 3 is a flowchart of an anomaly Identification, grouping, and diagnostic process 120. The process 120 contemplates implementation as a method having steps, via a processing device or cloud service configured to implement the steps, and as a non-transitory computer-readable medium including instructions that, when executed, cause one or more processors to implement the steps. The process 120 is described with reference to the automated anomaly detection and cross domain correlation system 12.

The process 120 includes identifying individual anomalies within each domain of the mobile network 10 (step 122), correlating the anomalies into cross-domain groups (step 124), and diagnosing anomaly groups (step 126).

Within each of these domains 14, 16, 18, 20 (including the synchronization domain 20), the steps of anomaly detection is known in the art. Typical techniques for anomaly detection for each of the monitored KPIs within each domain will include fixed thresholds or adaptive thresholds (e.g., moving average, linear regression and polynomial regression).

Each identified anomaly can include

Start time: the earliest time when the KPI threshold breach was detected
End time: the time when the KPI value returned to a normal value
KPI value time series dataset, comprising the values of the KPI immediately before the anomaly, during the duration of the anomaly and immediately after the KPI has returned to normal
Severity: a categorization of how far the KPI has deviated from a normal value, e.g., "Warning", "Minor", "Major" or "Critical"
Impact: a measure of the number of mobile subscribers or mobile services that have been impacted by the anomaly
Dimensional signature: the dimensional attributes of the data used to calculate the KPI. For each data source, there will be a different set of attributes, e.g., for the synchronization domain 20, the dimensional attributes might be: Clock ID (unique identifier of the clock), Clock Type (master, slave, boundary, . . . ), Clock state, Source Type (the source of the clock's time data), Source Identifier (a unique identifier for the source), etc.

For data sources where multiple records are used to calculate KPIs, the dimensional signature may also contain information on the relative distributions of different values. For example, where NR call trace records are used to calculate Handover Failure Rates, those records representing failed handovers may contain several different values for the Source and Destination dimensions, so all the unique values and their counts are stored as part of the dimensional signature.

For anomaly correlation, see the process defined in U.S. Pat. No. 11,522,766, the individual anomalies are correlated together into anomaly groups. Groups can include anomalies from a single domain (e.g., multiple RAN anomalies related to radio Link, secondary cell group (SCG) and Handover Failures), or may include anomalies from multiple different domains.

As per U.S. Pat. No. 11,522,766, the root cause diagnostics process hierarchy defines the cause and effect relationships between the domains.

Root Cause Diagnosis

Figure 4:
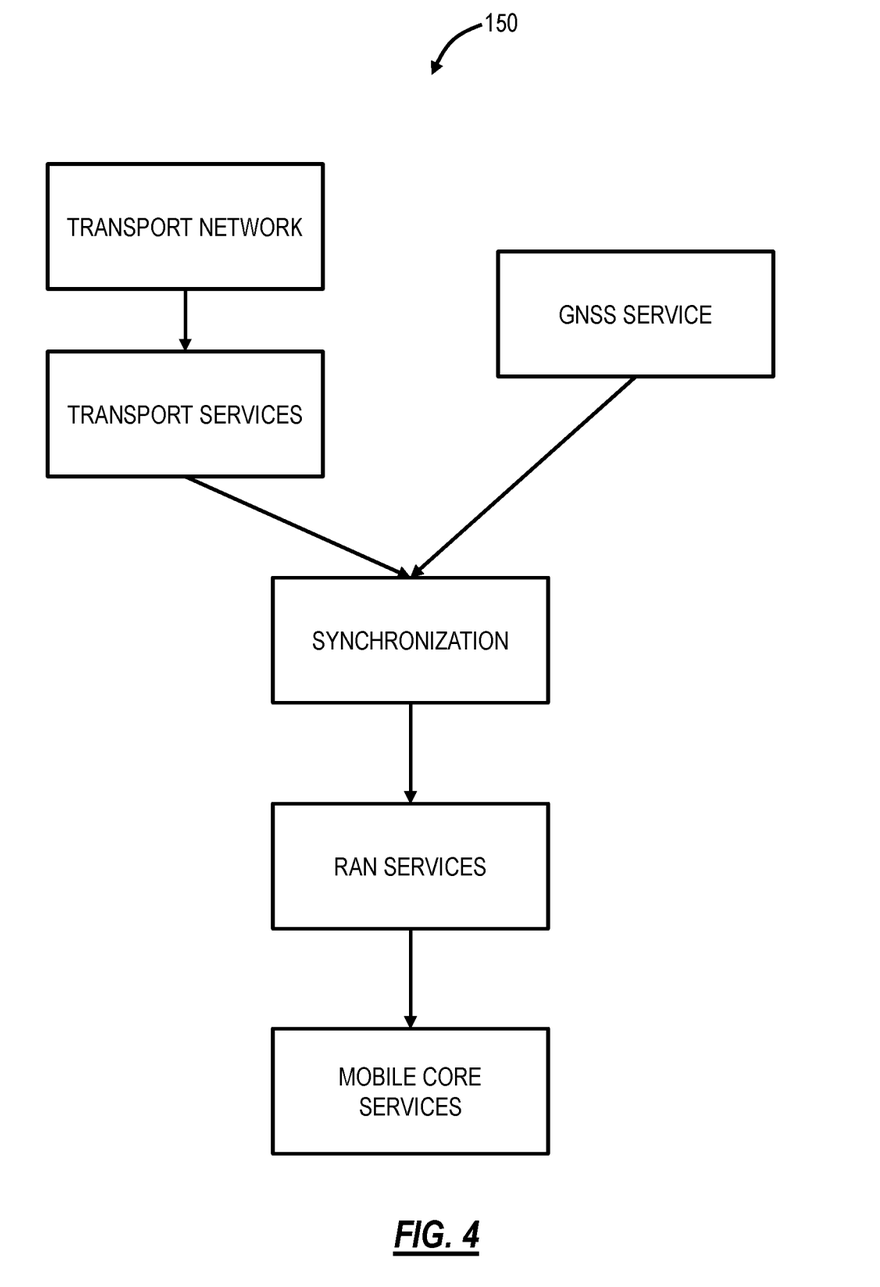
FIG. 4 is a diagram of a domain hierarchy for root cause diagnosis.

FIG. 4 is a diagram of a domain hierarchy 150 for root cause diagnosis. Some examples of how this correlation and root cause diagnosis would work are the following:

(1) Correlation of synchronization domain anomalies with transport network and/or transport service domain anomalies—anomalies are detected independently in the synchronization and transport domains, and then correlated together to indicate where the transport network or service has not been able to successfully deliver the PTP timing messages between the clocks. The dimensional analysis provided by the system 12 indicates which specific clocks were impacted, along with the corresponding transport network elements and/or services that are likely to be responsible. This can lead to a determination that the root cause of the synchronization problem is the transport network/service performance and/or configuration.

(2) Correlation of synchronization domain anomalies with 5G mobile core domain anomalies—Anomalies are detected independently across the synchronization and core service domains. Subsequent correlation by the system 12 allows to identify where problems with mobile services (e.g., inter-radio access technology (RAT) handovers, carrier aggregation) are likely to be related to sync problems. This can lead to a determination that the root cause of the Quality of Experience (QoE) problems with services in the mobile core is a poor synchronization performance and/or configuration.

(3) Correlation of synchronization domain anomalies with GNSS domain anomalies—Anomalies are detected independently across the synchronization and GNSS service domains. Subsequent correlation by the system 12 allows to identify where problems with synchronization are likely to be related to GNSS problems. This can lead to a determination that the root cause of synchronization problems is poor GNSS performance and/or configuration.

(4) Correlation of synchronization domain anomalies with RAN domain anomalies—Anomalies are detected independently across the synchronization and RAN service domains. Subsequent correlation by the system 12 allows to identify where problems with RAN are likely to be related to sync problems. This can lead to a determination that the root cause of RAN problems is a poor synchronization performance and/or configuration.

(5) Correlation of anomalies across 3, 4 or 5 domains—Anomalies are detected independently across multiple domains. Subsequent correlation by the system 12 allows to identify where problems identified with one domain are likely to be related (cause or effect) to problems in other domains. This can lead to a determination that the root cause of multiple service-impacting and/or customer-impacting problems has a single root cause (which may be Sync, Transport, or RAN).

Processing System

Figure 5:
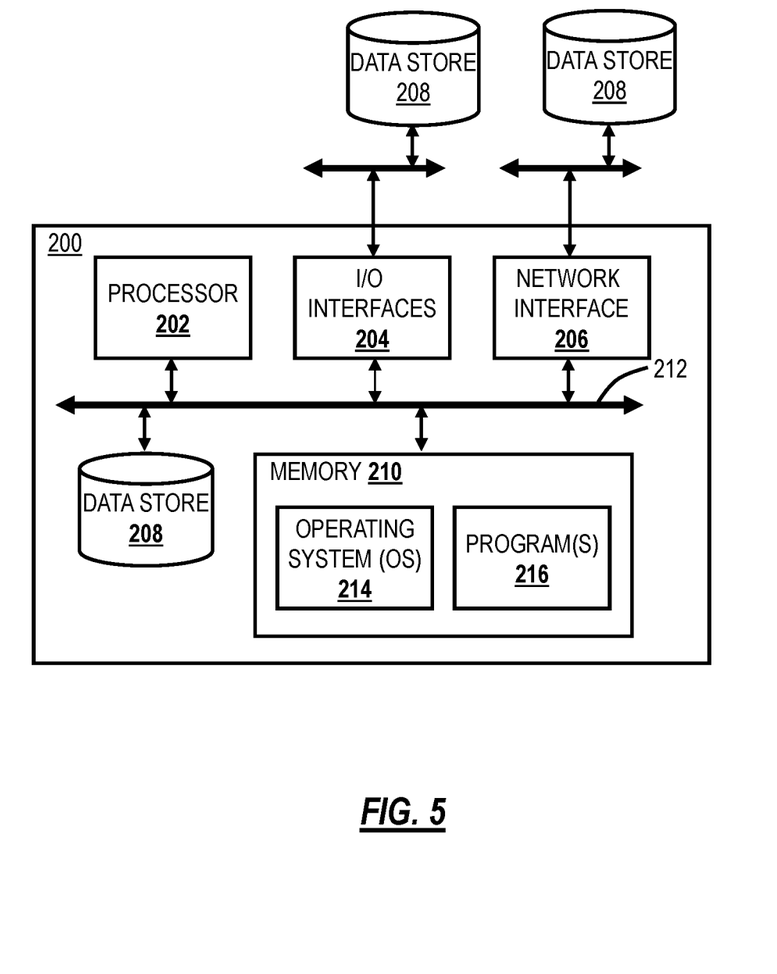
FIG. 5 is a block diagram of a processing system.

FIG. 5 is a block diagram of a processing system 200. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In another embodiment, one or more processing systems 200 can be configured in a cluster and/or in a cloud system. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

The processing system 200 can provide a physical implementation of the automated anomaly detection and cross domain correlation system 12, the modules 22, 24, 26, 28, 30, and the like.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A method implemented by a cloud service for mobile network synchronization domain anomaly identification and correlation, the method comprising steps of:
    receiving, at the cloud service, measurements from a synchronization domain reflecting performance of synchronization across a mobile network;
    identifying synchronization domain anomalies in the measurements from the synchronization domain, wherein an anomaly is an event in the mobile network causing any of network outages, disruptions, and poor quality;
    performing an automated cross-domain correlation via a cloud-based cross-domain correlation system, the automated cross-domain correlation correlating the synchronization domain anomalies against anomalies from other domains of the mobile network via the cloud service, wherein the anomalies from the other domains are detected from performance data collected from components of each respective domain; and
    based on the correlation (1) identifying root causes of the synchronization domain anomalies and the anomalies from the other domains, (2) identifying associated impact on services and/or subscribers of the synchronization domain anomalies and the anomalies from the other domains, and (3) identifying remedial actions for the synchronization domain anomalies and the anomalies from the other domains;
    wherein the correlating of the synchronization domain anomalies against the anomalies from the other domains includes a transport network domain of a transport network, where anomalies associated with the transport network domain are determined based on any of resource utilization, port utilization, dropped packets, packet loss, latency, and jitter, and wherein identifying the root causes includes determining by detecting anomalies independently prior to the correlating wherein correlating the anomalies associated with the transport network domain with the synchronization domain anomalies indicates where the transport network has not been able to successfully deliver Precision Time Protocol (PTP) timing messages between a plurality of clocks.

2. The method of claim 1, wherein the other domains include one or more of a radio access network (RAN) domain, the transport domain, and a mobile core domain.

3. The method of claim 1, wherein the synchronization domain includes
    receivers in the mobile network configured to calculate a reference time from a Global Navigation Satellite System (GNSS); and
    a plurality of clocks configured to measure transmission delays, calculate the reference time, and communicate to one another via precision time protocol (PTP) messages.

4. The method of claim 1, wherein the measurements are synchronization metrics from the synchronization domain taken at each end point where time and phase synchronization is required and include any of a maximum time error (TE), a constant time error (cTE), and a dynamic time error (dTE), each synchronization metric being determined at a mobile network location defining a point in the mobile network.

5. The method of claim 1, wherein the synchronization domain anomalies are further correlated with anomalies from a Global Navigation Satellite System (GNSS) domain, and based thereon, a root causes of the synchronization domain anomalies is determined to be due to an accuracy of a received time reference based on any of average signal strengths of all satellites in use, Time Dilution of Precision (TDOP), Position of Dilution of Precision (PDOP), and mean accuracy associated with the GNSS domain.

6. The method of claim 1, wherein the correlating of the synchronization domain anomalies against the anomalies from the other domains further includes a radio access network (RAN) domain and a mobile core domain, and wherein the anomalies from the other domains are based on any of failures, Data radio bearer (DRB) Accessibility, Quality of service (QOS) Flow Retainability, DRB Retainability, and Handover Success Rate.

7. The method of claim 1, wherein each of the synchronization domain anomalies and the anomalies from the other domains are defined by time values, severity, impact, and a dimensional signature.

8. The method of claim 1, wherein the correlating the synchronization domain anomalies against the anomalies from the other domains of the mobile network further includes
analyzing measurements from the synchronization domain and measurements from the other domains, collectively forming measurements data on several dimensions associated with an event.

9. The method of claim 8, wherein the analyzing includes determining precision time protocol (PTP) messages are being dropped or delayed, determining a root cause of the synchronization domain anomalies is a transport domain issue.

10. The method of claim 8, wherein the analyzing includes determining a correlation between the synchronization domain anomalies and a mobile core anomaly, determining a root cause of the mobile core anomaly is a synchronization domain issue.

11. The method of claim 8, wherein the analyzing includes determining a correlation between the synchronization domain anomalies and a radio access network (RAN) anomaly, determining a root cause of the RAN anomaly is a synchronization domain issue.

12. A non-transitory computer-readable medium comprising instructions, for mobile network synchronization domain anomaly identification and correlation, that, when executed, cause one or more processors associated with a cloud service to:
receive, at the cloud service, measurements from a synchronization domain reflecting performance of synchronization across a mobile network;
identifying synchronization domain anomalies in the measurements from the synchronization domain, wherein an anomaly is an event in the mobile network causing any of network outages, disruptions, and poor quality;
performing an automated cross-domain correlation via a cloud-based cross-domain correlation system, the automated cross-domain correlation correlates the synchronization domain anomalies against anomalies from other domains of the mobile network via the cloud service, wherein the anomalies from the other domains are detected from performance data collected from components of each respective domain; and
based on the correlation (1) identify root causes of the synchronization domain anomalies and the anomalies from the other domains, (2) identify associated impact on services and/or subscribers of the synchronization domain anomalies and the anomalies from the other domains, and (3) identify remedial actions for the synchronization domain anomalies and the anomalies from the other domains;
wherein the correlating of the synchronization domain anomalies against the anomalies from the other domains includes a transport network domain of a transport network, where anomalies associated with the transport network domain are determined based on any of resource utilization, port utilization, dropped packets, packet loss, latency, and jitter, and wherein identifying the root causes includes determining by detecting anomalies independently prior to the correlating wherein correlating the anomalies associated with the transport network domain with the synchronization domain anomalies indicates where the transport network has not been able to successfully deliver Precision Time Protocol (PTP) timing messages between a plurality of clocks.

13. The non-transitory computer-readable medium of claim 12, wherein the other domains include one or more of a radio access network (RAN) domain, the transport domain, and a mobile core domain.

14. The non-transitory computer-readable medium of claim 12, wherein the synchronization domain includes
receivers in the mobile network configured to calculate a reference time from a Global Navigation System (GNSS); and
a plurality of clocks configured to measure transmission delays, calculate the reference time, and communicate to one another via precision time protocol (PTP) messages.

15. The non-transitory computer-readable medium of claim 12, wherein the measurements from the synchronization domain include any of a maximum time error (TE), a constant time error (cTE), and a dynamic time error (dTE), each being determined at a point in the mobile network.

16. The non-transitory computer-readable medium of claim 12, wherein the synchronization domain anomalies are further correlated with anomalies from a Global Navigation Satellite System (GNSS) domain, and based thereon, a root causes of the synchronization domain anomalies is determined to be due to an accuracy of a received time reference based on any of average signal strengths of all satellites in use, Time Dilution of Precision (TDOP), Position of Dilution of Precision (PDOP), and mean accuracy associated with the GNSS domain.

17. The non-transitory computer-readable medium of claim 12, wherein the correlating of the synchronization domain anomalies against the anomalies from the other domains includes a radio access network (RAN) domain and a mobile core domain, and wherein the anomalies from the other domains are based on any of failures, Data radio bearer (DRB) Accessibility, Quality of service (QOS) Flow Retainability, DRB Retainability, and Handover Success Rate.

18. The non-transitory computer-readable medium of claim 12, wherein the correlating the synchronization domain anomalies against the anomalies from the other domains of the mobile network further includes
analyzing measurements from the synchronization domain and measurements from the other domains, collectively forming measurements data on several dimensions associated with an event.

19. A method implemented by a cloud service for mobile network synchronization domain anomaly identification and correlation, the method comprising steps of:
receiving, at the cloud service, measurements from a synchronization domain reflecting performance of synchronization across a mobile network;
identifying synchronization domain anomalies in the measurements from the synchronization domain, wherein an anomaly is an event in the mobile network causing any of network outages, disruptions, and poor quality;
performing an automated cross-domain correlation via a cloud-based cross-domain correlation system, the automated cross-domain correlation correlating the synchronization domain anomalies against anomalies from other domains of the mobile network via the cloud service, wherein the anomalies from the other domains are detected from performance data collected from components of each respective domain; and
based on the correlation (1) identifying root causes of the synchronization domain anomalies and the anomalies from the other domains, (2) identifying associated impact on services and/or subscribers of the synchronization domain anomalies and the anomalies from the other domains, and (3) identifying remedial actions for the synchronization domain anomalies and the anomalies from the other domains;
wherein the synchronization domain anomalies are correlated with anomalies from a Global Navigation Satellite System (GNSS) domain, and based thereon, the root causes of the synchronization domain anomalies is determined to be due to an accuracy of a received time reference based on any of average signal strengths of all satellites in use, Time Dilution of Precision (TDOP), Position of Dilution of Precision (PDOP), and mean accuracy associated with the GNSS domain.

* * * * *